United States Patent [19]

Boon et al.

[11] 4,194,859
[45] Mar. 25, 1980

[54] SELF CLEANING COLLECTOR SYSTEM

[75] Inventors: Bruce T. E. Boon, Wayne; Armand P. Timmins, Sparta, both of N.J.

[73] Assignee: Eastern Cyclone Industries, Inc., Fairfield, N.J.

[21] Appl. No.: 940,469

[22] Filed: Sep. 8, 1978

[51] Int. Cl.[2] ............................................. B65G 53/60
[52] U.S. Cl. ....................................... 406/172; 55/301
[58] Field of Search .................. 406/171, 172; 55/301, 55/302, 303

[56] References Cited

U.S. PATENT DOCUMENTS

| | | | |
|---|---|---|---|
| 3,481,116 | 12/1969 | Ferri | 406/172 X |
| 3,486,309 | 12/1969 | Wild | 55/302 X |
| 3,829,165 | 8/1974 | Boon | 406/171 |

*Primary Examiner*—James L. Rowland
*Attorney, Agent, or Firm*—Anthony J. Casella

[57] ABSTRACT

A self cleaning apparatus for use in separating material from air in a material-air conveyance system includes an outer housing and a perforated inner housing. A freely pivotable panel member is hingedly mounted on the outer housing, the panel normally being in the open position thus exposing an aperture in the outer housing. When a conveyance cycle is initiated, a downstream blower initially draws air into the system through the aperture in the collector outer housing thus blowing inwardly particles lodged in the perforate inner housing. The negative pressure of the air being thus drawn in the system acts to close the panel member until the conveyance cycle is completed and the downstream blower switched off. The force of gravity then pulls the panel member back to its normally open position until another conveyance cycle is initiated.

14 Claims, 4 Drawing Figures

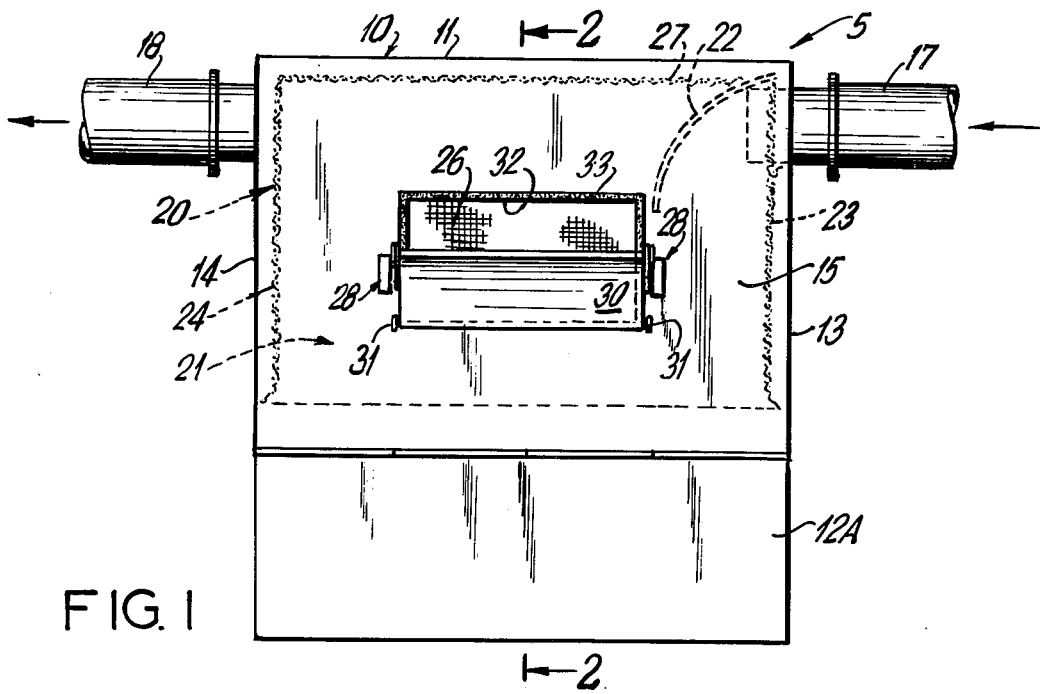
FIG. 1
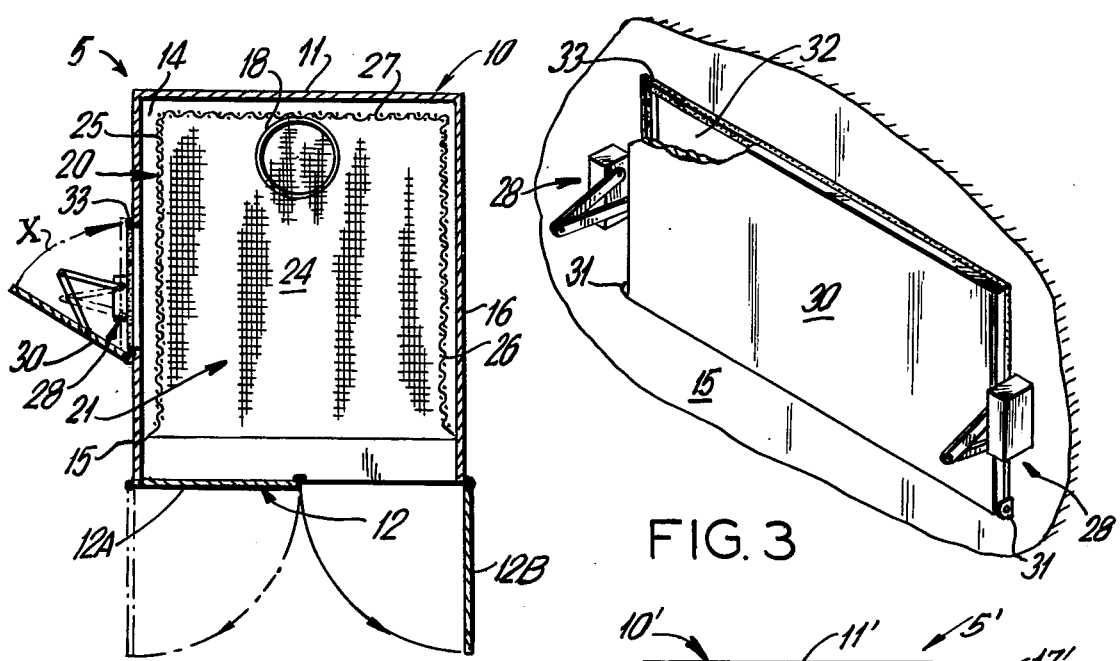
FIG. 2
FIG. 3
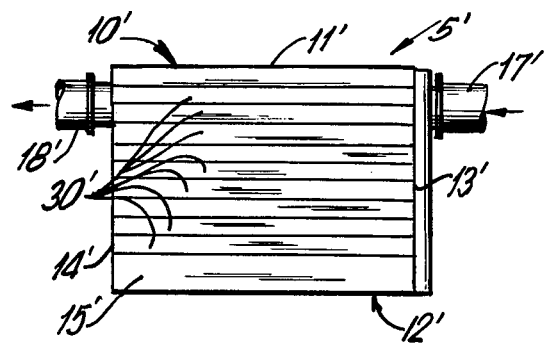
FIG. 4

SELF CLEANING COLLECTOR SYSTEM

BACKGROUND OF THE INVENTION

The subject invention is applicable to all pneumatic conveying systems as for example Boon U.S. Pat. No. 3,388,260, issued June 11, 1968, entitled "Photo Sensitive Device for Conveying and Counting Fabrics"; U.S. Pat. No. 3,469,931, issued Sept. 30, 1969 entitled "Method for Treating Materials"; U.S. Pat. No. 3,524,681, issued Aug. 18, 1970 entitled "Laundry and Fabric Collector and Method Having a Constant Vacuum"; U.S. Pat. No. 3,606,478, issued Sept. 20, 1971 entitled "Trash and Refuse Depository System" U.S. Pat. No. 3,747,986, issued July 24, 1973 entitled "Pneumatic Bulky Material Collector System"; U.S. Pat. No. 3,807,807, issued Apr. 30, 1974 entitled "Feeding Device for Bulk Material to a Pneumatic Conveying System"; U.S. Pat. No. 3,829,165, issued Aug. 13, 1974 entitled "Anti-Stoppage Apparatus And Method for Air Conveying Systems"; and Haight et al, U.S. Pat. No. 4,076,321, issued Feb. 28, 1978 entitled "Electronic Control System For Operating A Pneumatic Trash & Liner Conveying Network" all assigned to the assignee herein.

The present invention is concerned with an apparatus and method relating to a pneumatic conveying system wherein the efficiency of the system is greatly increased; particularly with respect to the separation of the materials being conveyed from the pneumatic conveying stream, such as an air stream. The material being conveyed may be of any type, including very small particles, but this system is particularly useful with the larger or bulkier light weight items, such as laundry, bed linens, fabrics, papers and generally trash or refuse.

In pneumatic conveying systems certain problems are encountered at stations for the removal of conveyed material from the system. At these stations the conveyed material is usually separated from the pneumatic stream by perforated elements such as screens or perforated plates which permits the air to flow therethrough and causes the material to fall into receiving hoppers having various arrangements of doors through which the material is removed from the system. However, these perforated elements tend to become clogged generally with lint and light weight materials. In addition, the trash and soiled laundry being conveyed often contain oils and other liquids which coagulate the lint and fine particles onto the perforated screens such that they harden thereon after a period of time. As certain holes or perforations become clogged, the velocity and strength of the air streams through the remaining still open or unclogged holes increases proportionally thereby greatly aggravating the problem and necessitating the shutting down of the entire system at periodic intervals for cleaning the material from blocking the holes, by steam cleaning and/or brisk brushing. It will be appreciated that such occasional shut down periods as well as the cost of labor for cleaning the pertinent screen members are undesirable.

Accordingly, it is an object of the subject invention to provide means for automatically and simply cleaning the material collectors so as to reduce the amount of down time and provide a more efficient and economical pneumatic conveying system.

SUMMARY OF THE INVENTION

In accordance with the above recited objectives, the subject invention provides an automatic self cleaning collector apparatus for use in separating material from a material-air conveying system. The subject collector apparatus includes an outer housing member having an entry portion, an exit portion, a closed top portion, and a releasable base portion. The outer housing is in communication with an inlet conduit for admitting the material and air into the outer housing. The outer housing is also in communication with an outlet conduit for removing the air from the outer housing. The outlet conduit is in communication with means for drawing the air through the collector apparatus, the means typically being a downstream blower. A perforated inner housing member is disposed within the outer housing member and includes an entry portion, an exit portion, and a closed top portion. The bottom portion of the inner housing is open such that the releasable base portion of the outer housing together with the entry, exit and top portions of the inner housing define an interior compartment. The inner housing is in communication with the inlet conduit such that conveying air will separate from the material and will flow through the perforations into passageways between the respective housing members and be removed through the outlet conduit. A freely pivotable panel member is hingedly connected along its bottom portion to the outer housing member. The panel member is normally in the open position thus exposing an aperture in the outer housing. Thus, when the blower is activated at the initiation of a conveying cycle, the air initially being drawn into the collector apparatus is drawn through the outer housing aperture thus blow cleaning a portion of the inner housing member by blowing any particles thereon into the interior compartment. In addition, after a short interval, the suction of the air thus being drawn in and through the outer housing aperture acts to close the panel member against the outer housing until the conveyance cycle is completed whereupon the force of gravity causes the panel member to resume its normally open position. Preferably, a sealing member, typically a gasket, is disposed on the periphery of the outer housing aperture so as to prevent leakage of air through said aperture when the panel member is in the closed position. In addition, it is preferable that means for minimizing the impact of said panel member against the outer housing be included. In order to effect the cleaning of a greater area of the inner housing member, more than one freely pivotable panel member may be included. In addition, in an alternate embodiment of the subject invention, rather than having individual panel members, it is contemplated that the outer housing include a plurality of slats or shutter members some of which are locked closed, others of which are releasable to the open position, such that for every conveyance cycle different shutters are left open, and a different portion of the interior housing is cleaned.

BRIEF DESCRIPTION OF THE DRAWINGS

FIG. 1 is an elevational view of the collector apparatus of the subject invention.

FIG. 2 is a cross-sectional view of the collector apparatus of the subject invention, taken along lines 2—2 of FIG. 1.

FIG. 3 is an enlarged perspective view, broken away in part of the automatic cleaning panel member of the collector apparatus of the subject invention.

FIG. 4 is an elevational view of an alternate embodiment of the collector apparatus of the subject invention.

BRIEF DESCRIPTION OF THE PREFERRED EMBODIMENT

Referring to FIGS. 1 and 2, the collector apparatus 5 of the subject invention includes an outer housing 10, which is substantially a parallelopiped in configuration having a top wall 11, a base portion 12, an entry wall 13, an exit wall 14, and a pair of opposed side walls 15 and 16. As illustrated in the figures, base portion 12 comprises a pair of releasable door members 12A and 12B which are hingedly connected to side walls 15 and 16 respectively, for selectively emptying the contents of the housing. An inlet conduit 17 communicates at one end thereof with entry wall 13 through an access opening in said wall for admitting into outer housing 10 the material being conveyed, along with the pneumatic conveying means which is typically air. The other end of inlet conduit 17 is typically connected to a plurality of conveying conduits (not shown), each of which has an upstream entry port for admitting air into the system. An outlet conduit 18 communicates with side wall 14 through an access opening in said wall for releasing the air from housing 10. It will be understood that means for drawing air through the above-mentioned conduits and housing 10 is connected to outlet conduit 18, downstream thereof, said means typically comprising a blower, the suction portion of which being closest to outlet conduit 18. It will also be understood that in a typical pneumatic conveying system, the blower will be located closer to the collector apparatus than will the air entry ports of the conveying conduits. The effect of this proximity will be described below.

The subject apparatus 5 also includes an inner housing member 20 which is disposed within outer housing 10, the inner housing 20 having an entry portion 23, an exit portion 24, a pair of side walls 25–26 and a closed top wall 27, said inner housing portions and walls being adjacent their corresponding outer housing walls. The bottom portion of inner housing member 20 is open. Thus, there is formed an interior compartment 21 defined by inner housing 20 and releasable door members 12A and 12B of outer housing 10. Inner housing 20 is typically perforated or of mesh construction such that the pneumatic conveying means, i.e., the air, may easily pass therethrough while the material being conveyed may not. It will be understood that the portion of inner housing entry portion 23 adjacent entry wall 13 of outer housing 10 includes an access opening for communicating with inlet conduit 17 such that the material being conveyed may be admitted into interior compartment 21. Preferably, a deflector member 22 is included within interior compartment 21 for directing the material being conveyed downwardly towards releasable doors 12A and 12B. In addition, it is preferable that deflector 22 be perforated and/or have louvers slanted in the direction of the flow of air and material such that the inertia of the conveyed material will carry the material downwardly but at the same time, a certain amount of air will separate from the material and pass through the deflector thus minimizing any turbulence in the lower portion of inner housing 20.

In a typical conveyance cycle the material to be conveyed is introduced to a conveyance conduit, and the downstream blower is switched on, thus drawing air and the material through the conveyance conduit, inlet conduit 17, outer and inner housings 10 and 20, and into interior compartment 21. As gravity and deflector 22 direct the material downwardly towards releasable doors 12A and 12B, the air continues through inner housing 20 and outlet conduit 18. It will be understood that while the larger parcels of material being conveyed will be confined within interior compartment 21 until released through doors 12A and 12B, fine particles of dirt, lint, grease, etc., will be drawn through inner housing 20 and otherwise tend to clog the perforations or mesh apertures thereof. In addition, particles not drawn through inner housing 20, but remaining in a state of turbulence within the interior compartment because of the in-rush of air, may tend to stick to the interior portions thereof also clogging the perforations and apertures, thus resulting in poor performance of the system if not cleaned periodically.

In accordance with the subject invention, the collector apparatus 5 includes means for automatically cleaning perforated inner housing 20 at the start of each conveyance cycle. More particularly, referring to FIGS. 1–3, the subject apparatus 5 includes a freely pivotable panel member 30 which is hingedly mounted along its bottom portion on side wall 15 of outer housing 10 by hinges 31.

As illustrated most clearly in FIG. 2, panel member 30 is normally in the open position thus exposing an aperture 32 in side wall 15 of outer housing 10 (see FIG. 3). Preferably, hinges 31 are constructed so as to act as stop means for limiting the angle X at which panel 30 opens to within the preferred range of approximately 60° to 80° relative to the vertical. As indicated above, collector apparatus 5, and of course, panel member 30 and aperture 32, are located relatively close to the downstream blower (not shown) as compared to the air entry ports disposed at the upstream extreme of the conveyance conduits. Thus, when the blower is activated, substantially all of the air drawn into the apparatus 5 at the initiation of a cycle comes through aperture 32. In addition, because of the relative proximity between aperture 32 and the downstream blower, the air being drawn into aperture 32 rushes in at a very high velocity in a direction perpendicular to the portion of inner housing 20 directly adjacent aperture 32. The inrush of air effectively cleans the surface of inner housing 20 in the general vicinity of aperture 32 by blowing any particles disposed thereon inwardly into interior compartment 21. Not only does the inrush of air clean the portion of inner housing 20 adjacent aperture 32, but also the air suction or negative pressure causes panel member 30 to close whereupon all the air being drawn into the apparatus is from the air entry port at the upstream extreme of the conveyance conduits for conveying the material therethrough and into the collector apparatus. In the preferred embodiment of the subject invention sealing means, typically a gasket member 33, is disposed around the periphery of aperture 32 so as to prevent leakdage of air therethrough when panel 30 is in the closed position. In addition, means for absorbing or minimizing the impact of panel 30 as it closes against outer housing 10 is preferably included. The impact absorbing means, which is designated generally in the figures by reference numeral 28, may be any known shock absorbing means.

Once a conveyance cycle has been completed, and the downstream blower switched off, panel 30 resumes its normal open position as a result of the force of gravity and/or by the counteracting force of the shock absorber 28. Thus, there is provided a simple, but completely automatic means for cleaning the perforated or mesh inner housing member 20 just prior to each cycle. As indicated above, the high velocity inrush of air through aperture 32 effects an air blow cleaning of the portion of inner housing 20 in the general area of aperture 32. In addition, the periodic inrush of air perpendicular to the perforated housing prevents the formation of a hard coagulated mass thereof. In order to increase the area of the inner housing 20 that may be cleaned, another panel member may be added to outer housing on side wall 16, and/or 15 and/or the size of the panels may be increased. It will be appreciated, however, that the increase in size, and/or number of panels proportionally decreases the velocity at which the air is drawn in therethrough, thus reducing the air scrubbing action.

Accordingly, in an alternate embodiment of the subject invention cyclically operated shutter or slat members may be employed rather than individual panel members. More particularly, referring to FIG. 4, the collector apparatus 5' of the alternate embodiment of the subject invention includes an outer housing 10' having a top wall 11', a bottom wall 12' comprising a pair of releasable door members (not shown), an entry wall 13', an exit wall 14' and a pair of opposed side walls 15' (only one shown). Of course alternate collector apparatus 5' also includes an inner perforated housing and deflector which are identical to their counterpart of collector 5. As illustrated in FIG. 4, side wall 15' comprises a plurality of slat or shutter means 30', each of which is pivotally mounted along its bottom portion. It will be understood that the side wall not shown in FIG. 4 may also include a plurality of pivotable slat members, and so may entry and exit walls 13' and 14'. In accordance with the alternate embodiment of the subject invention, rather than being freely pivotable and subject merely to the force of gravity and the air suction, the slat members 30' may individually, or in groups, be set to open cyclically prior to the initiation of a conveyance cycle. For example, for the first conveyance cycle the uppermost slat or slats 30' may be released to the open portion while all the remaining slats are locked closed. When the cycle is initiated the cleaning air is drawn through the open slat or slats cleaning the portion of the inner housing generally adjacent thereto. As the open slat or slats 30' close because of the suction of the air, said slats automatically lock. For the next cycle, another slat or group of slats are released to the open position such that when the conveyance cycle is initiated the cleaning air is drawn therethrough thus, cleaning another portion of the inner housing. The automatic releasing and locking of the various slat or group of slats continues until substantially the enitre inner housing has been cleaned, whereupon the first slat or slats released are again released to restart another complete cleaning cycle. Preferably, the alternate embodiment of the subject collector apparatus 5' includes sealing means for preventing leakage of air through the slats 30' while they are in the closed position during a conveyance cycle. In addition, it is preferable that means for absorbing or minimizing the impact of the slats 30' against the outer housing 10' be included.

In summary, the subject invention provides a new and improved collector apparatus for use in a pneumatic conveying system. The subject collector apparatus includes simple and automatic self-cleaning means which minimizes the down time of the system, and renders the system more efficient and less costly to operate.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed is:

1. An automatic, self-cleaning collector apparatus for use in separating material from a material-air conveying system comprising:

an outer housing member having an entry portion, an exit portion, a closed top portion, and a releasable base portion, said outer housing member being in communication with an inlet conduit for the admittance of said material and air, said outer housing further being in communication with an outlet conduit for the removal of said air therefrom, said outlet conduit being in communication with means for drawing the air through said collector apparatus;

a perforated inner housing member, disposed within said outer housing member, having an entry portion, an exit portion, and a top portion, the bottom portion of said inner housing member being open such that the releasable base portion of said outer housing and the entry, exit and top portions of said inner housing member define an interior compartment, said inner housing member being in communication with said inlet conduit such that conveying air will separate from said material and will flow through said perforations into passageways between the respective housing members and be removed through said outlet conduit; and a freely pivotable panel member hingedly connected along its bottom portion to said outer housing member, said panel member normally being in the open position at a predetermined angle relative to the vertical, thus exposing an aperture in the outer housing whereby when said means for drawing air through the apparatus is activated at the start of a conveying cycle, the air initially being drawn therein is drawn through said outer housing aperture thus cleaning a portion of said inner housing member by blowing any particles thereon into said interior compartment, said air being drawn in through said outer housing aperture further acting to close said panel member against the inner housing until the conveyance cycle is completed whereupon the force of gravity causes said panel member to resume its normally open position.

2. An apparatus as recited in claim 1 which further includes sealing means for preventing leakage of air from said outer housing aperture when said panel member is in the closed position.

3. An apparatus as recited in claim 2 in which said sealing means is a gasket member disposed around the periphery of said outer housing aperture.

4. An apparatus as recited in claim 1 which further includes means for minimizing the impact of said panel member against the outer housing when said panel member moves from the open to the closed position.

5. An apparatus as recited in claim 1 for which the angle formed between said panel member and the vertical when said panel member is in the open position is in the range of approximately 60° to 80°.

6. An apparatus as recited in claim 1 which further includes means disposed within said inner housing for directing said material downwardly towards the releasable base portion of said outer housing.

7. An apparatus as recited in claim 1 in which said releasable base portion comprises a pair of selectively releasable door members.

8. An apparatus as recited in claim 1 in which said means for drawing air through said apparatus comprises a blower disposed downstream of said outlet conduit, the suction portion of said blower being disposed closest to said outlet conduit.

9. An automatic, self-cleaning collector apparatus for use in separating material from a material-air conveying system comprising:
an outer housing member having an entry portion, an exit portion, a closed top portion, and a releasable base portion, said outer housing member being in communication with an inlet conduit for the admittance of said material and air, said outer housing further being in communication with an outlet conduit for the removal of said air therefrom, said outlet conduit being in communication with a downstream blower, the suction portion of which being disposed closest to said outlet conduit;
a perforated inner housing member disposed within said outer housing member having an entry portion, an exit portion, and a top portion, the bottom portion of said inner housing member being open such that the releasable base portion of said outer housing and the entry, exit and top portions of said inner housing member define an interior compartment, said inner housing member being in communication with said inlet conduit such that conveying air will separate from said material and will flow through said perforations into passageways between the respective housing members and be removed through said outlet conduit;
a freely pivotable panel member hingedly connected along its bottom portion to said outer housing member, said panel member normally being in the open position at an angle in the range of approximately 60° to 80° relative to the vertical, thus exposing an aperture in the outer housing whereby when said blower is activated at the start of a conveyance cycle the air initially being drawn therein is drawn through said outer housing aperture thus cleaning a portion of said inner housing member by blowing any particles thereon into said interior compartment, said air being drawn in through said outer housing aperture further acting to close said panel member against the outer housing until the conveyance cycle is completed whereupon the force of gravity causes said panel member to resume its normally open position;
means for preventing leakage of air through said outer housing aperture while said panel member is in the closed position; and
means for minimizing the impact of said panel member as it closes against said outer housing.

10. An apparatus as in claim 9 which further includes means disposed within said inner housing for deflecting said material downwardly towards said releasable base portion of the outer housing.

11. An automatic, self-cleaning collector apparatus for use in separating material from a material air conveying system comprising:
an outer housing member having an entry portion, an exit portion, a closed top portion, and a releasable base portion, said outer housing member being in communication with an inlet conduit for the admittance of said material and air, said outer housing further being in communication with an outlet conduit for the removal of said air therefrom, said outlet conduit being in communication with means for drawing the air through said collector apparatus;
a perforated inner housing member, disposed within said outer housing member, having an entry portion, an exit portion, and a top portion, the bottom portion of said inner housing member being open such that the releasable base portion of said outer housing and the entry, exit and top portions of said inner housing member define an interior compartment, said inner housing member being in communication with said inlet conduit such that conveying air will separate from said material and will flow through said perforations into passageways between the respective housing members and be removed through said outlet conduit;
a plurality of shutter members pivotally mounted on said outer housing;
means for selectively placing at least one of said shutter members in the open position at a predetermined angle relative to the vertical while maintaining the remaining shutter members closed prior to a conveyance cycle thus exposing an aperture in the outer housing whereby when said means for drawing air through the apparatus is activated at the start of a conveyance cycle the air initially being drawn therein is drawn through the outer housing aperture adjacent said open shutter member, cleaning a portion of said inner housing member by blowing any particles thereon into said interior compartment, said air being drawn in through said shutter aperture further acting to close said open shutter member against the outer housing; and
means for varying which shutter member is initially in the open position prior to a conveyance cycle.

12. An apparatus as recited in claim 11 in which said at least one shutter member which is open prior to a conveyance cycle is disposed at an angle in the range of approximately 60°-80° relative to the vertical.

13. An apparatus as recited in claim 11 which further includes means for preventing leakage from said shutter members when they are in the closed portion.

14. An apparatus as recited in claim 11 which further includes means disposed within said inner housing for directing said material downwardly towards the releasable base portion of the outer housing.

* * * * *